Patented May 11, 1937

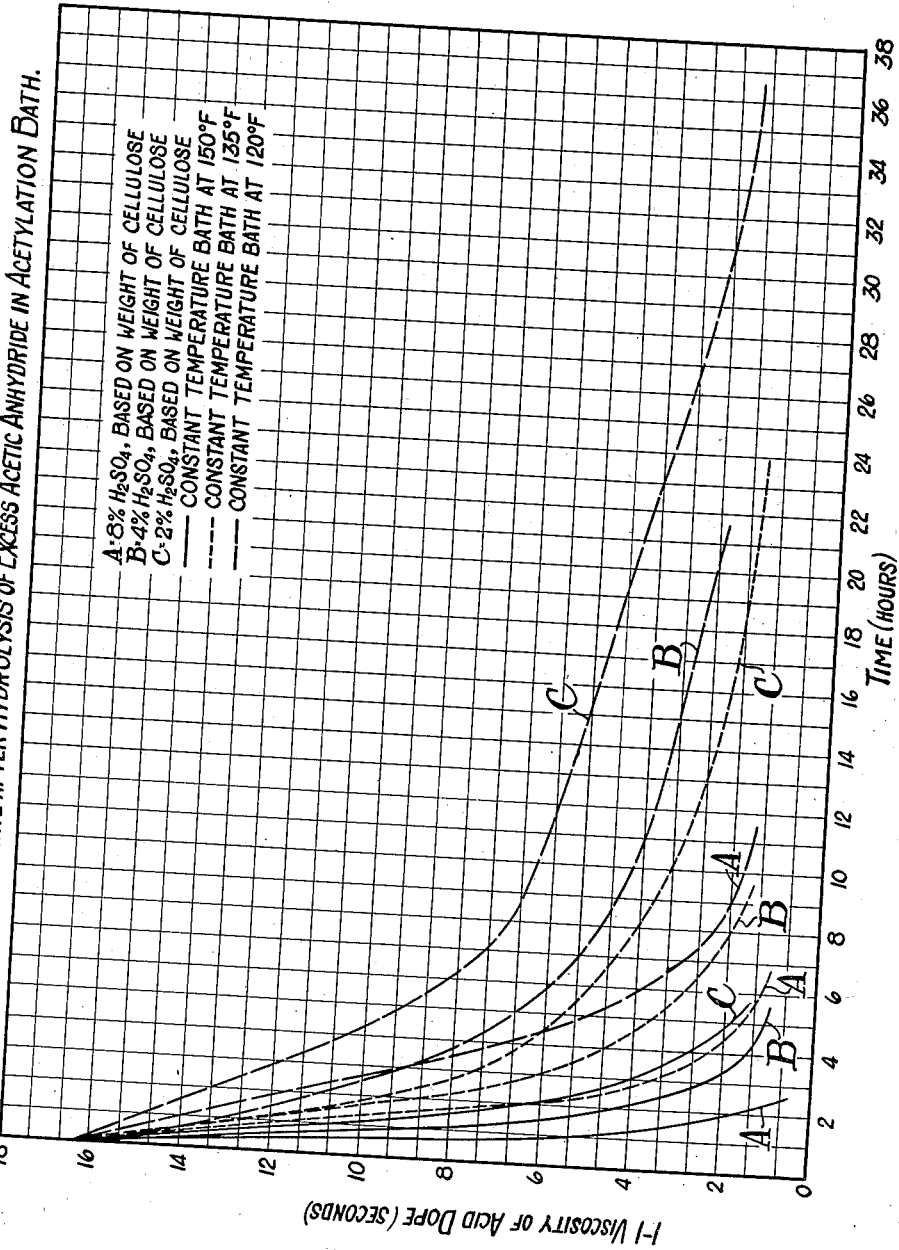

2,080,054

UNITED STATES PATENT OFFICE 2,080,054

PREPARATION OF ORGANIC ACID ESTERS OF CELLULOSE OF LOWERED VISCOSITY

Carl J. Malm and Howard S. Gardner, Jr., Rochester, N. Y., assignors, by mesne assignments, to Eastman Kodak Company, Jersey City, N. J., a corporation of New Jersey Application December 7, 1935, Serial No. 53,390

7 Claims. (Cl. 260—102)

The present invention relates to a process of lowering the viscosity of an organic acid ester of cellulose between the esterification and hydrolysis steps of its preparation in which the anhydride, which is present in the reaction mixture in which it is dissolved, is converted to the corresponding acid and the ester is then subjected to an elevated temperature until a product of the desired viscosity is reached.

Heretofore in the preparation of a cellulose acetate, or other cellulose ester of low viscosity the lowering of the viscosity was accomplished either in the pretreatment, the esterification or the hydrolysis step. The control of the viscosity of the cellulose ester in the pretreatment of the cellulose such as by subjecting the cellulose to an elevated temperature, has been very difficult as there is no satisfactory method known to rapidly determine the viscosity to which the cellulose has been reduced. Although a low viscosity ester can be prepared by pretreatment of the cellulose at a high temperature the viscosity which the final product will have cannot be readily predicted.

Control of the viscosity of a cellulose ester by modification of the esterification step, such as by using different amounts of catalysts or carrying out the reaction at different maximum temperatures, has been satisfactory in the production of the high viscosity esters, however, where a low viscosity ester is desired, the maximum reaction temperature should be very high or a considerable amount of catalyst should be employed. These severe conditions result in a very rapid reaction and difficulty in controlling the viscosity of the product. Because of the severity of the treatment, there is also considerable danger of an undesirable break-down of the cellulose through acetolysis towards the end of the reaction.

The production of lower viscosity esters by reducing the viscosity during the hydrolysis has the disadvantage that the reaction temperature and the amount of catalyst should be very high. These conditions result in a rapid rate of hydrolysis and consequently it is almost impossible to stop the hydrolysis at the desired acyl content.

An object of our invention is to provide a method of producing a cellulose ester having the desired viscosity in which the viscosity-reducing treatment employed does not interfere with the control of the esterification process. We have found that if a cellulose ester is first produced by any standard method for preparing it, that at the end of the esterification and prior to the hydrolysis the viscosity may be brought to that desired. Our process comprises adding to the completed reaction mixture containing the ester in solution, a sufficient quantity of water to convert all of the anhydride present to the corresponding acid but without leaving any excess water present and then raising the temperature to a point where the viscosity drops at an easily controlled rate.

The amount of water necessary to be added, to convert the excess anhydride to the corresponding acid, can be determined by the amount of anhydride which is present. The amount of anhydride present may be determined by the method described in Malm and Nadeau application Serial No. 736,966, filed July 25, 1934 in which aniline is employed to determine the amount of anhydride present. The amount of water necessary will be an amount chemically equivalent to the anhydride contained in the completed reaction mixture.

The temperature to which the mass should be raised after the destruction of the anhydride depends on the amount and nature of the catalyst which is present, the viscosity desired and the time which can be given to this step. The accompanying drawing illustrates the effect of the concentration of sulphuric acid and the temperature on the reduction of the viscosity of cellulose acetate after the hydrolysis of the anhydride. It will be noted that with 8% of sulphuric acid based on the cellulose that the viscosity drops rapidly so that if only a small reduction in viscosity is desired, it would be desirable to use a small amount of sulphuric acid. However, if a cellulose ester of extremely low viscosity is desired, it may be obtained by the use of the higher amount of sulphuric acid and the more elevated temperature. Obviously, if some other catalyst is employed instead of sulphuric acid, the most suitable amount of catalyst and temperatures would have to be adapted thereto. Except for perchloric acid, other esterification catalysts are usually not as effective as sulphuric acid so that the use of larger quantities of those catalysts would be desirable in the viscosity reducing step in accordance with the present invention. It may be seen from the drawing that where the amount of catalyst is small, the temperature at which the viscosity reduction is carried out may be fairly high. Obviously, if the proportion of sulphuric acid is decreased still more, higher temperatures than those given may be employed. As a matter of fact, even with the use of 2% sulphuric acid based on the weight of the cellulose, a higher temperature than those specified may be employed. If a large percentage of sulphuric acid based on the weight of the cellulose is employed lower temperatures are preferred.

For instance the temperature may be as low as 110° F. and the viscosity of the ester will be lowered particularly in the presence of a large proportion of sulfuric acid (based on the cellulose). The temperature may be as high as 170° F. but as pointed out above the higher temperatures are of greater value when a small proportion of catalyst (based on the cellulose) is present as the time consumed in lowering the viscosity is considerably shortened thereby as illustrated in the accompanying drawing.

During the course of the viscosity reduction, the mass may be tested at any time to determine the viscosity. When the desired viscosity is reached, a hydrolyzing mixture is then added and the temperature of the reaction mass is lowered at the same time to a point where the hydrolysis can be easily controlled, for instance 100° F. The hydrolysis is then carried out in the ordinary way. The viscosity of an unhydrolyzed cellulose ester in solution in its reaction mixture may be determined as follows:

Weigh out 20 grams of the cellulose ester solution into a 100 cc. beaker and add 20 cc. of a mixture of equal parts by volume of glacial acetic acid and tetrachlorethane. When the whole is homogeneous and free from lumps, cool to 25° C. and pour into a 12 mm. diameter tube which is kept at 25° C. The viscosity may then be determined by noting the time (in seconds) required for a ⅛ inch glass bead, weighing .05 grams, to drop through a 10 cm. column of the solution.

The present method of reducing viscosity has the advantage that the cellulose is not degraded due to its acetolysis or hydrolysis. If a marked reduction in viscosity is desired, time can be saved by carrying out the first part of the viscosity reduction step at a high temperature such as 150 to 160 or even 170 degrees F. and then finishing it at a lower temperature such as 120° or by neutralizing a part of the catalyst toward the end of the treatment.

The following examples illustrate processes for preparing cellulose esters which embody our invention:

*Example I.*—2½ lbs of cotton linters were treated with a mixture of 11½ lbs. of acetic acid and 3½ lbs. of propionic acid for four hours at 150° F. 6 lbs. of 85% acetic anhydride was added and the mixture was then cooled to 45° F. whereupon a mixture of 2½ lbs. of acetic acid, 1½ lbs. of 85% acetic anhydride and 44.8 cc. of sulphuric acid was added. The esterification was then carried out to the maximum temperature of 90° F. and a dope having an acetic acid-tetrachlorethane viscosity of 100 seconds was obtained.

A sample was withdrawn and the amount of acetic anhydride was determined by the method referred to above. This was found to be 2.34%. To convert this acetic anhydride to acetic acid .32 lbs. of a mixture containing two parts of acetic acid and one part of water was added and the temperature of the dope was raised to 135° F. The viscosity at this point was found to be 90 seconds. One-half hour later the viscosity was 40 seconds, an hour later six seconds and two hours later two seconds.

A mixture of 5.8 lbs. of acetic acid and 2.9 lbs. of water was then added and the temperature of the mixture was dropped to 100° F. The hydrolysis was carried out by maintaining the mixture at 100° F. for 50 hours. A low viscosity cellulose acetate propionate containing 3% propionyl and 36% acetyl was obtained.

*Example II.*—100 lbs. of cotton linters were pretreated with a mixture of 640 lbs. of acetic acid and 400 cc. of sulfuric acid at 100° F. for two hours. The whole was cooled to 60° F. and 280 lbs. of 85% acetic anhydride was added thereto. The temperature was controlled so that it rose from 60° to 100° F. over a period of four hours. The reaction mixture was held at this temperature until it was free from grain and had a good appearance.

The amount of anhydride present in the completed reaction mixture was determined to be 25 lbs. This excess of anhydride was converted to acetic acid by adding a mixture of 9 lbs. of acetic acid and 4.4 lbs. of water thereto, together with 6.6 lbs. of sulfuric acid to bring the proportion of sulfuric acid present up to approximately 8% based on the weight of the cellulose. The acetic acid-tetrachlorethane viscosity of the solution of cellulose acetate was 16 seconds. The temperature of the mass was raised to 120° F. and after an hour the solution had a viscosity of about 14 seconds. At the end of three hours, the viscosity had dropped to nine seconds while at the end of nine hours, the viscosity was found to be two seconds.

A mixture of 50 lbs. of water and 100 parts of acetic acid was then added and the mass was maintained at 100° F. until acetone-solubility was reached. This usually requires 30–40 hours. A low viscosity cellulose acetate was obtained.

The present invention is also applicable to reducing the viscosity of other cellulose esters of the lower fatty acids such as for example cellulose acetate butyrate, cellulose propionate and cellulose butyrate. As was pointed out above, other catalysts besides sulfuric acid might be employed in the esterification and the present invention could be employed to reduce the viscosity of the esters formed, the rate of viscosity reduction usually being less than where sulfuric acid is employed. Other catalysts which might be employed are perchloric acid, sulfuric acid-phosphoric acid, thionyl chloride, etc. As illustrated by the second example, if the proportion of catalyst desired is not already present, an additional amount may be added preferably with the mixture of fatty acid and water to convert the anhydride to the corresponding acid.

The esters prepared in accordance with the present invention may be employed in any connection where low viscosity cellulose esters are employed at the present time such as in lacquers or coating compositions.

We claim:

1. In the preparation of an organic acid ester of cellulose in which cellulose is esterified in a bath containing an excess of organic acid anhydride, an acylation catalyst and a solvent for the cellulose ester, the steps which comprise adding to the completed reaction mixture approximately just sufficient water to convert the remaining acid anhydride to the corresponding acid and then subjecting the mixture containing the cellulose ester to a temperature of 110–170° F. until the desired viscosity is obtained.

2. In the preparation of an organic acid ester of cellulose in which cellulose is esterified in a bath containing an excess of acetic anhydride, an acylation catalyst and a solvent for the cellulose ester, the steps which comprise adding to the completed reaction mixture approximately just sufficient water to convert the remaining acetic anhydride to acetic acid and then subjecting the mixture containing the cellulose ester to a temperature of 110–170° F. until the desired viscosity is obtained.

3. In the preparation of an organic acid ester of cellulose in which cellulose is esterified in a bath containing an excess of organic acid anhydride, an acylation catalyst and a solvent for the cellulose ester, the steps which comprise adding to the completed reaction mixture approximately just sufficient water to convert the remaining acid anhydride to the corresponding acid, subjecting the mixture containing the cellulose ester to a temperature of 110–170° F. until the desired viscosity is obtained and then adding aqueous acid to the mixture and hydrolyzing the ester to the desired degree.

4. In the preparation of an organic acid ester of cellulose in which cellulose is esterified in a bath containing an excess of organic acid anhydride, a sulfuric acid catalyst and a solvent for the cellulose ester, the steps which comprise adding to the completed reaction mixture approximately just sufficient water to convert the acid anhydride to the corresponding acid and then subjecting the mixture containing the cellulose ester and the sulfuric acid catalyst to a temperature of 110–170° F. until the desired viscosity is obtained.

5. In the preparation of an organic acid ester of cellulose in which cellulose is esterified in a bath containing an excess of organic acid anhydride, an acylation catalyst and a solvent for the cellulose ester, the steps which comprise adding to the completed reaction mixture approximately just sufficient water to convert the acid anhydride to the corresponding acid and then subjecting the mixture containing the cellulose ester to a temperature of approximately 135° F. until the desired viscosity is obtained.

6. In the preparation of an organic acid ester of cellulose in which cellulose is esterified in a bath containing an excess of organic acid anhydride, 15% of sulfuric acid, based on the weight of the cellulose, and a solvent for the cellulose ester, the steps which comprise adding to the completed reaction mixture approximately just sufficient water to convert the remaining acid anhydride to the corresponding acid and then subjecting the mixture containing the cellulose ester to a temperature of approximately 135° F. until the desired viscosity is obtained.

7. In the preparation of an organic acid ester of cellulose in which the cellulose is esterified in a bath containing an excess of organic acid anhydride, a sulfuric acid catalyst and a solvent for the cellulose ester, the steps which comprise adding to the completed reaction mixture approximately just sufficient water to convert the remaining acid anhydride to the corresponding acid and then subjecting the mixture containing the cellulose ester to a temperature of about 135° F. until the desired viscosity is obtained.

CARL J. MALM.
HOWARD S. GARDNER, Jr.